(12) United States Patent
Ferreira et al.

(10) Patent No.: US 12,164,539 B2
(45) Date of Patent: Dec. 10, 2024

(54) SYSTEMS AND METHODS OF JOINING DATA RECORDS AND DETECTING STRING SIMILARITY

(71) Applicant: MASTERCARD INTERNATIONAL INCORPORATED, Purchase, NY (US)

(72) Inventors: Tadeu Augusto Ferreira, Toronto (CA); Ravi Santosh Arvapally, Telangana (IN)

(73) Assignee: Mastercard International Incorporated, Purchase, NY (US)

( * ) Notice: Subject to any disclaimer, the term of this patent is extended or adjusted under 35 U.S.C. 154(b) by 0 days.

(21) Appl. No.: 18/071,294

(22) Filed: Nov. 29, 2022

(65) Prior Publication Data
US 2024/0176795 A1    May 30, 2024

(51) Int. Cl.
*G06F 16/00* (2019.01)
*G06F 16/25* (2019.01)

(52) U.S. Cl.
CPC .................. *G06F 16/258* (2019.01)

(58) Field of Classification Search
CPC .................................................. G06F 16/258
USPC ................................................ 707/600–899
See application file for complete search history.

(56) References Cited

U.S. PATENT DOCUMENTS

| | | | |
|---|---|---|---|
| 2020/0057914 A1* | 2/2020 | Hintz | G06F 18/21 |
| 2021/0248149 A1* | 8/2021 | Somani | G06F 40/30 |
| 2023/0112250 A1* | 4/2023 | Agrawal | G06F 16/24537 |
| | | | 707/714 |

* cited by examiner

*Primary Examiner* — Irete F Ehichioya
*Assistant Examiner* — Shirley D Hicks
(74) *Attorney, Agent, or Firm* — Pillsbury Winthrop Shaw Pittman LLp (57) ABSTRACT

The disclosure relates to methods and systems of joining data structures based on a composite similarity score (CSS). For example, a computer system may use a plurality of similarity models to generate respective similarity scores. Each similarity score may be a metric that indicates a confidence that a first data value of a first data record is similar to a second data value of a second data record. The computer system may generate the CSS based on the plurality of similarity sub-scores. The CSS may indicate a confidence that the records being compared are similar. Thus, the CSS may be used to detect similar data records across different data structures. The disclosure also relates to a string similarity model that detects similarity among strings without respect to an order of words in each string and in a way that tolerates errors or omissions in one or both strings.

20 Claims, 8 Drawing Sheets

FIG. 1

FIG. 2 — Table 101

| | Name | Address | City | Geocoordinates | ... | Other Data Fields |
|---|---|---|---|---|---|---|
| | 211A | 211B | 211C | 211D | | 211N |
| 201A | ABC company | 123 Main Street Suite 101 | Anytown | | ... | |
| 201B | Acme Company | 222 Chistreet, Suite 500 | Chitown | | ... | |
| 201N | Hiscorp. | 111 Hisstreet | Histown | | ... | |

FIG. 3 — Table 103

| | Name | Address | City | Geocoordinates | ... | Other Data Fields |
|---|---|---|---|---|---|---|
| | 213A | 213B | 213C | 213D | | 213N |
| 203A | Johns Corp. | Mystreet 401 #232A | | | ... | |
| 203B | ABC co. | Main Street 123 #101 | Mytown | | ... | |
| 203N | Hercorp. Inc. | Herstreet 785 #123 | Hertown | | ... | |

SYSTEMS AND METHODS OF JOINING DATA RECORDS AND DETECTING STRING SIMILARITY

BACKGROUND

Different data structures may be joined together using a common data field or index. However, joins and indices require tight coupling such as an exact match between the data structures. When such coupling is not possible, such as when the data structures are independently generated and maintained, it may be difficult to identify data records that are used to join the data structures. For example, joining the data structures may require matching data records from each data structure. However, the different data structures may have variation in the way they store data values. For example, one data structure may store an address with address elements like building number, street number, and other address elements in one order while another data structure may store its address elements in a different order. Other variations may include transcription errors, or not storing all or a portion of the address altogether. Such variation may make it difficult to join the data structures. Machine-learning (ML) models may be trained to classify data or predict outcomes based on training data. However, ML models may require robust training data, manual labeling of the training data, and may be sensitive to variation in the training data and/or input data. Thus, training an ML model to identify join fields in the data structures may be inefficient and inaccurate. These and other problems exist for joining different data structures.

BRIEF DESCRIPTION OF THE DRAWINGS

Features of the present disclosure may be illustrated by way of example and not limited in the following figure(s), in which like numerals indicate like elements, in which.

DETAILED DESCRIPTION

The disclosure relates to methods and systems of joining data structures based on a compound similarity of data records in the data structures. Each data structure may store a plurality of data records. For example, a first data structure may store a first data record and a second data structure may store a second data record. Each data record may have a plurality of data fields. Some data records in the first data structure and other data records in the second data structure may relate to the same entity. However, it may be difficult to join the data structures because of variation in the data values stored in different data structures. Such variation may include a difference in the order of segments in data, transcription or other errors in the data, formatting differences, and/or other types of variation that may make joining the first data record with the second data record.

A computer system may be improved to mitigate against these and other variations. For example, the computer system may use a plurality of similarity models to generate a plurality of similarity sub-scores. Each similarity sub-score may be a metric that indicates a confidence that a first data value of a first data field in a first data record is similar to a second data value of a second data field in a second data record. The computer system may generate a compound similarity score (CSS) based on the plurality of similarity sub-scores. The CSS may indicate a confidence that the records being compared are similar. Thus, the CSS may be used to detect similar data records across different data structures. The similarity sub-scores may include a string similarity score, a geocoordinate similarity score, and/or other types of similarity scores that assess similarity between different data values of data records being assessed for similarity.

A string similarity model may generate the string similarity score, which may indicate a level of confidence that strings are similar to one another without respect to an order of segments of the compared strings. For example, differences between the order of words or other segments in a first string and the order of words or other segments in a second string may not affect a string similarity score for the first string and the second string. Furthermore, the string similarity model may tolerate transcription or other errors. The computer system may generate a plurality of string similarity scores for each of a plurality of data fields of the data records being compared. In this manner, the computer system may detect similarity among a first data record in a first data structure with a second data record in a second data structure in a comprehensive and robust way that can tolerate errors in one or more of the data fields of either or both data records. The term "string similarity" and "string" are used for illustration. It should be noted that the string similarity model may generate a string similarity score for other types of data having segments.

A geo similarity model may generate the geocoordinate similarity score, which may indicate a level of confidence that geocoordinates are similar. For example, the first data record may store first geocoordinates and the second data record may store second geocoordinates. The geocoordinate similarity score may indicate a confidence that the first and second geocoordinates are similar to one another based on a distance between the geocoordinates in which closer distances are deemed to be more similar.

Based on the CSS, the computer system may determine whether the first data record matches with and therefore should be joined with the second data record. Thus, the data fields of the first data record may be enriched with one or more data fields of the second data record. Alternatively, or additionally, one or more data fields of the second data record may replace corresponding fields of the first data record, such as when the second data record is deemed to have more accurate or otherwise more correct data then the first data record. Having described a high-level overview of various system functions, attention will now turn to an example of a system for joining data structures, including a computer system that uses a string similarity model for detecting similarity among data such as strings.

Figure 1:
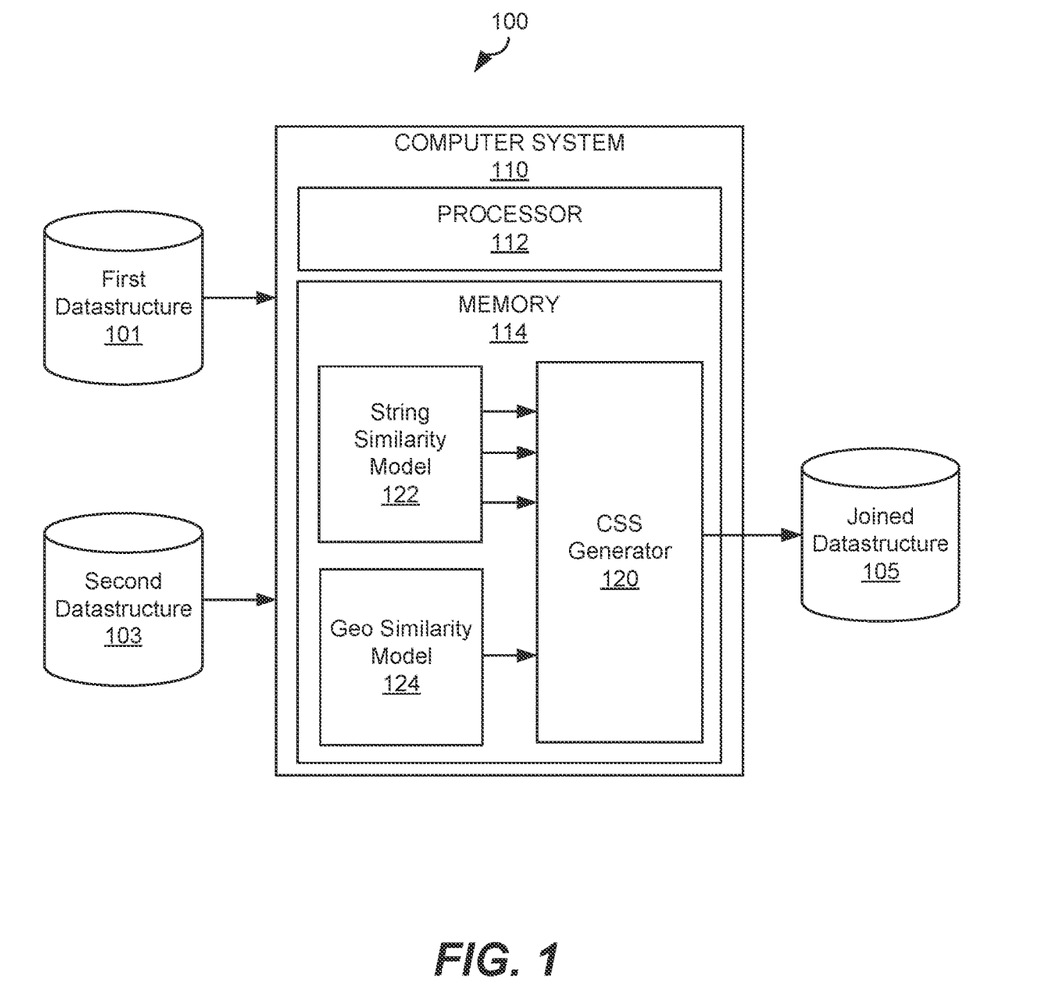
FIG. 1 illustrates an example of a computer system for joining data structures based on compound similarity between respective data records of the data structures.

For example, FIG. 1 illustrates an example of a computer system 110 for joining data structures 101 and 103 based on compound similarity between respective data records of the data structures. The term "data structure" may refer to the way in which data values are stored or arranged so that a given data value is categorized in the data structure. For example, a data structure may include data records in which each data record has a plurality of data fields. Each data field may have an associated data value. Thus, data values may be categorized by data fields. Such categorization may be stored as a column heading and column value, a key-value pair, a relational database column and value, and/or other manner in which data values are categorized. Although only two data structures 101 and 103 are shown for illustration, the computer system 110 may join other numbers of data structures. Examples of data structures 101 and 103 will be described with reference to FIGS. 2 and 3.

Figure 2:
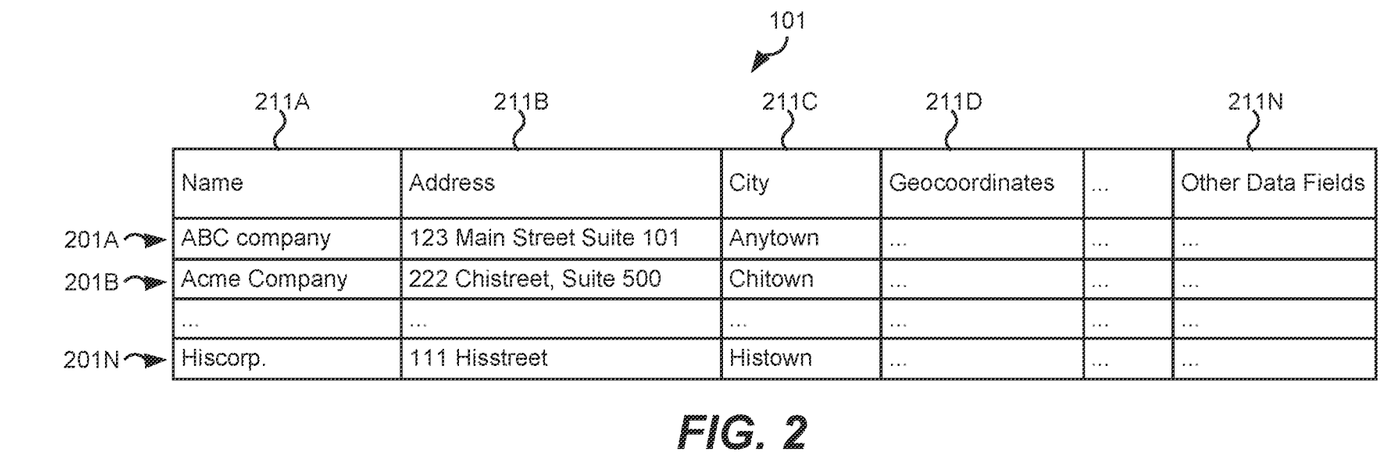
FIG. 2 illustrates an example of a first data structure that stores data records having data fields that store entity data.

Referring to FIG. 2, data structure 101 may include a plurality of data records 201A-N. Each data record 201 may store data relating to an entity. The entity may include a company (such as a merchant), a person, a device, and/or object for which data may be stored. Each data record 201 may include a plurality of data fields 211A-N. Each data field 211 may store a data value. The data value may be information relating to the entity. For example, the data fields 211A-N may include a name, an address, a city, and/or other data fields relating to the entity. Similarly, referring to FIG. 3, data structure 103 may include a plurality of data records 203A-N. Each data record 201 may store data relating to an entity. Each data record 203 may include a plurality of data fields 213A-N. Each data field 213 may store a data value.

Figure 3:
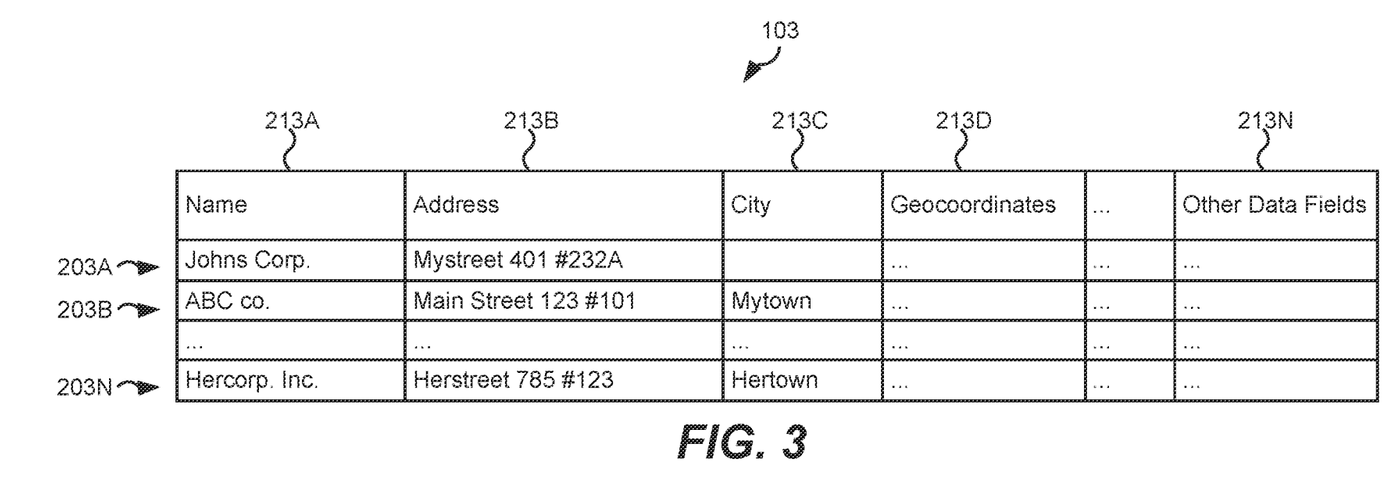
FIG. 3 illustrates an example of a second data structure that stores data records having data fields that store entity data.

The data structures 101 and 103 may each, independently of one another, store respective data records 201 and 203 about entities. For example, data structure 101 may be internal data maintained by a first operator relating to businesses and data structure 103 may be generated and stored by a second operator. In one example, the first operator receives third party data from a third-party data provider that provides the data structure 103. One example of the third-party data provider is AggData, which provides data relating to merchants or other entities.

At least some of the data records 201 and 203 may relate to the same entity. For example, data record 201A and data record 203B may relate to the same entity. It should be noted that the similarity of entity names is for illustrative purposes—in other examples, entity names may differ significantly even though the data record 201A and data record 203B relate to the same entity. The data fields 211A-N and 213A-N may store the same type of data about the same entity, but with values that have: an exact match, a match with variation (whether due to error, formatting, or other differences in data stored in the data records 201 and 203), or no match at all.

For example, the data structure 101 may store a first string that encodes an address of the entity in a data field 211 and the data structure 103 may store a second string that encodes its address of the entity in a data field 211. However, in this example, even though the address from both data sources refer to the address of the same entity, the first string may vary from the second string. Such variation may occur because one or both data sources: made a mistake in recording its address, rearranged an order of the parts of the address, formatted the address differently than the other, made abbreviations that the other did not make, and/or otherwise has variations in referring to the data object. To illustrate, the first string stored in the data field 211B of data record 201A may be "123 Main Street Suite 101" while the second string stored in the data field 213B of the data record 203B may be "Main Street 123 #101". When this variation occurs, it may be computationally difficult to determine that the first string and the second string refers to the same address of the same entity. For example, a computer may assess the similarity of string using an edit distance, which is a similarity metric that assesses the similarity of strings based on a number of edits that would be required to modify one string to match another string. In the foregoing example, even though the first string "123 Main Street Suite 101" likely refers to the same address as "Main Street 123 #101" but with formatting differences. String similarity metrics such as edit distance may assess various penalties that count against similarity. This is because an edit distance metric is based on a number of edits that have to be made to one string to exactly match another string. In this case, the edit distance may count changes that need to be made to the first string to match the second string: deleting the leading "123", adding a trailing "123" to the end, removing "Suite" from the first string, and adding "#" to the first string.

Having described examples of data structures 101 and 103 and examples of data variation that makes it difficult to computationally determine whether data records 201 and 203 should be joined, attention will now turn to the computer system 110. The computer system 110 may include one or more computing devices that join data structures 101 and 103 based on compound similarity between respective data records 201 and 203 of the data structures. For example, the computer system 110 may evaluate each data record 201 against each data record 203 to determine whether the evaluated pair of records should be joined. The term "join" in this context refers to identifying a data record in data structure 101 that refers to the same entity as a data record in data structure 103. The one or more computing devices of the computer system 110 may each include a processor 112, a memory 114, a compound similarity score ("CSS") generator 120, a string similarity model 122, a geo similarity model 124, and/or other components. Other types of similarity generators may be used and combined by the CSS generator 120. For example, data known about the entity's business vertical or category may be used to assess whether data records 201 and 203 from the data structure 101 and the data structure 103 should be joined.

The processor 112 may be a semiconductor-based microprocessor, a central processing unit (CPU), an application specific integrated circuit (ASIC), a field-programmable gate array (FPGA), and/or other suitable hardware device. Although the computer system 110 has been depicted as including a single processor 112, it should be understood that the computer system 110 may include multiple processors, multiple cores, or the like. The memory 114 may be an electronic, magnetic, optical, or other physical storage device that includes or stores executable instructions.

The memory 114 may be, for example, Random Access memory (RAM), an Electrically Erasable Programmable Read-Only Memory (EEPROM), a storage device, an optical disc, and the like. The memory 114 may be a non-transitory machine-readable storage medium, where the term "non-transitory" does not encompass transitory propagating signals.

The CSS generator 120, the string similarity model 122, and the geo similarity model 124 may each be implemented as instructions, stored in the memory 114, that specifically programs the processor 112 to perform the functions described with respect to those instructions. Alternatively, or additionally, the CSS generator 120, the string similarity model 122, and the geo similarity model 124 may each be implemented in hardware to perform the functions.

The computer system 110 may use one or more verification points to generate a CSS. A verification point refers to a data field (such as data field 211 or 213) that is evaluated for similarity across data records 201 and 203. Examples of verification points may include a name of an entity, an address, a city name, and geocoordinates. Other types and numbers of verification points may be used as well or instead. To illustrate verification points, an address field 211B and 213B in the data records 201 and 203 may serve as a verification point to determine whether the address stored in data record 201 is similar to the address stored in data record 203.

The CSS generator 120 may generate a compound similarity score (CSS) that represents a confidence that a first data record 201 in the first data structure 101 should be joined with a second data record 203 in the second data structure 103. For example, the CSS may represent a confidence that the first data record 201 and the second data record 203 store data relating to the same entity and therefore that the underlying data records should be joined. When the first data record 201 and the second data record 203 are joined, one or more of the data fields 211A-N may replace a corresponding one or more of the data fields 213A-N (or vice versa). For example, an address from the second data record 203 in the second data structure 103 may replace an address in the first data record 201 or vice versa. In another example, one or more of the data fields 211A-N may enrich the data fields 213A-N (or vice versa). For example, a data field in the second data record 203 may not be present in the first data record 201, thereby augmenting the first data record with the data field by virtue of the joined first and second data records 201, 203.

The CSS generator 120 may generate the CSS based on a plurality of similarity sub-scores. The similarity sub-scores may include a string similarity score, a geocoordinate similarity score, and/or other scores. The CSS may be based on two or more string similarity scores for different data fields of the first data structure 101 and the second data structure 103. For example, the CSS may be based on a first string similarity score, a second string similarity score, and/or other string similarity scores. To illustrate, the CSS may be based on a first string similarity score that indicates a similarity between a first entity name stored in a first data record 201 of the first data structure 101 and a second entity name stored in a second data record 203 of the second data structure 103. The CSS may be further based on a second string similarity score that indicates a similarity between a first address stored in the first data record 201 of the first data structure 101 and a second address stored in the second data record 203 of the second data structure 103. In this example, the CSS may be based on both a similarity of entity names and addresses stored in the data records 201 and 203. If both the entity names and the addresses are similar, the CSS may indicate a higher confidence that the data records 201 and 203 refer to the same entity and therefore that the data records 201 and 203 should be joined if only one of the entity names or the addresses are similar. An example of a way to generate the CSS is shown in Equation 1:

$$CSS = \sum_{i=1}^{n} W_i S_i \quad (1),$$

in which:
CSS is the compound similarity score,
n=number of verification points used, and
$W_i S_i$ is the product of a similarity sub-score ($S_i$) for a verification point and its weight ($W_i$).

For example, to determine whether a first data record 201 from a first data structure 101 and a second data record 203 from a second data structure 103 should be joined, the CSS generator 120 may use the string similarity model 122 to compare three string fields (name, address, and city) from each data record 201, 203 and the geo similarity model 124 to compare a geocoordinate field from each data record 201, 203. In this example, an expanded Equation 1 will result in Equation 2:

$$CSS = W_{name} S_{name} + W_{address} S_{address} + W_{city} S_{city} + W_{geo} S_{geo} \quad (2).$$

The CSS generator 120 may aggregate the similarity sub-scores (S) to generate the CSS in ways other than summation (such as by taking an average or other value that uses the similarity sub-scores together). In some examples, the weights (W) for each similarity score may be set to default values. In some examples, the weights may be configured based on locale. For example, the address for some countries may be more (or less) consistent than the address provided for other countries. In these examples, the weight for the address may be adjusted up or down accordingly. The weights for other verification points may be similarly adjusted. In some examples, the weights may be adjusted periodically based on observed data. It should be noted that all the weights (W) will be normalized so that they sum to 1. It should be further noted that other numbers of string comparisons may be used, depending on the type and number of verification points that are identified.

The computer system 110 may compare the CSS with a threshold compound similarity value, which may have a default value. The default value may be set based on historical observations of data records 201 and 203 that have been joined. In some examples, the CSS may be configured based on specific data structures 101 and 103 being compared. This provides flexibility in customizing similarity parameters that are unique to given pairs of data structures 101 and 103 being compared.

String Similarity Model

The string similarity model 122 may generate a string similarity score that indicates a level of confidence that two input strings (or other data types having segments) are similar to one another. For purposes of illustration, the string similarity score may be a value between 0 and 1, in which 0 indicates no confidence in similarity of the strings to one another and 1 is the highest confidence in similarity. Other scoring scales may be used. A string processed by the string similarity model 122 may refer to a sequence of characters such as text, numbers, symbols, and/or other characters. A string may include one or more segments. A segment may refer to a portion of a string that is discrete from other portions. For example, a segment may include a word in a string. In another example, a segment may be a number that indicates an identifier.

Segments may be delineated from one another by one or more segment separators in the string. Typically, but not necessarily, a segment separator is whitespace. Other types of segment separators may be used, depending on the input strings being processed. In some examples, the string similarity model 122 may parameterize the segment separator. For example, the string similarity model 122 may receive, as an input parameter, a segment separator for processing an input string. Thus, strings with unique or otherwise specific segment separators, such as a "*", "I", and/or other specific characters, may be segmented into segments in a customized way. The string similarity model 122 may use a default segment separator (such as whitespace) and/or a parameter segment separator that specifies a specific segment separator to be used for one or both of the input strings being evaluated for similarity (hereinafter, "candidate strings").

A given segment may be abbreviated, contain errors such as misspellings, have a unique order with respect to other segments in a string, and/or have other variations depending on the source of the string. For example, a data structure 101 may store an address as a first string in which with a building number is followed by a street name (such as "123 Main Street") while a data structure 103 stores an address as a second string in which the building number follows the street name (such as "Main Street 123"). In another example, the data structure 101 may further store an entity name with a transcription error (such as "ABC conpamy" while the data structure 103 correctly spells the entity name (such as "ABC company"). In still another example, instead of or in addition to errors, the data structure 101 may store the entity name with an abbreviation, such as "ABC co." while the data structure 101 does not. Due to these and other variations in the way strings for various data fields of data records are stored in data structures 101 and 103, it may be difficult to determine whether a first data record from the data structure 101 refers to the same entity as a second data record from the data structure 103.

The string similarity model 122 may generate the sequence similarity score in a way that tolerates variation in ordering and sentence structure, misspellings, abbreviations and/or other variations between candidate strings. The string similarity model 122 may do so based on an intersection, near-intersection, and non-intersection of the candidate strings. Alternatively, or additionally, the string similarity model 122 may normalize the variations based on a cardinality of the string elements in the strings that differ from one another, thereby smoothing out relatively minor errors compared to the number or size of the string elements. In some examples, the string similarity model 122 may include a dictionary that maps terminology. For example, the dictionary may include a mapping between "Co." and "Company" so that these terms will match. Other mapped terminologies may be used as well such as "and" and "&" and so forth.

Figure 4:
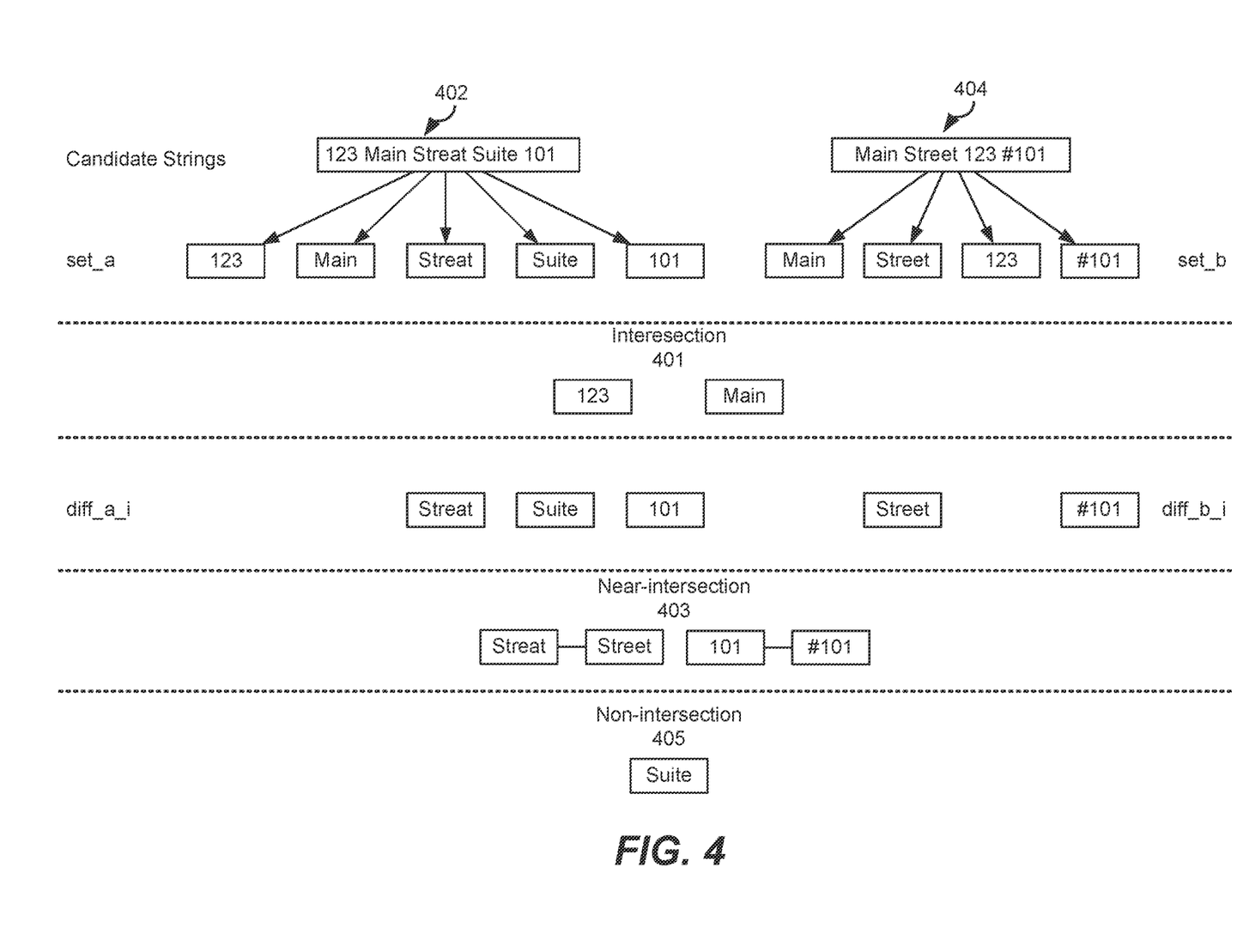
FIG. 4 illustrates an example data flow of intermediate data objects when generating a string similarity between candidate strings.

Operations of the string similarity model 122 will be made with reference to FIG. 4, in which an example of a candidate string 402 ("123 Main Streat Suite 101") and an example of a candidate string 404 ("Main Street 123 #101") will be described for illustration. Candidate string 402 includes a building number followed by a street name and office number identified by the word "Suite". In this example, candidate string 402 has a typographical error in the word "street". Candidate string 404 includes the street name followed by the building number and suite number designed with a "#" symbol. Computationally, it may be difficult to determine that candidate strings 402 and 404 refer to the same address. For example, using an edit distance metric alone would result in a similarity penalty for the ordering of the building number, the typographical error, and the variation in office number representation.

To mitigate against these and other variations, the string similarity model 122 may identify a plurality of segments for each of the candidate strings. For example, the string similarity model 122 may identify a first plurality of segments (set_a) by splitting the first candidate string 402 using a first segment separator and identify a second plurality of segments (set_b) by splitting the second candidate string 404 using a second segment separator. As illustrated, the first and second segment separators are each whitespace. However, segment separators other than whitespace may be used instead or in addition to only whitespace. It should be further noted that the first and second segment separators may be the same or different from one another, enabling customization and scalability for data structures that use different segment separators.

It should be noted that the string similarity model 122 may operate on any data that includes "segments." That is, the string similarity model 122 may take as input a plurality of segments of data and process them as segments. More particularly, in some examples, the string similarity model 122 may not have to split a string into segments. In these examples, the string similarity model 122 may take as input an array or other collection of segments such as words and compare that array to another array of segments, or to a string that has segments.

Identifying Intersections

The string similarity model 122 may identify an intersection 401 between set_a and set_b. The intersection 401 may include segments that are common to both set_a and set_b. For example, the intersection may include words that have exact matches in both set_a and set_b. In the illustrated example, the intersection 401 includes the segments "123" and "Main" since both of these segments are exactly in candidate string 402 (and its seta) and candidate string 404 (and its set_b).

Identifying Near-Intersections

The string similarity model 122 may compute a first difference set (diff_a_i) between set_a and the intersection and a second difference set (diff_b_i) between set_b and the intersection. Diff_a_i includes segments (if any) that are in set_a but not in the intersection. For example, diff_a_i may define words (and/or other segments) in the first string not found with an exact match to any of the words (and/or other segments) in the second string. In the illustrated example, diff_a_i includes segments "Streat," "Suite" and "101" because these segments are not in the intersection 401. Diff_b_i includes segments (if any) that are in set_b but not in the intersection. For example, diff_b_i defines the set of words (and/or other segments) in the second string not found with an exact match to any of the words (and/or other segments) of the first string. In the illustrated example, diff_b_i includes segments "Street" and "#101" because these segments do not appear in the intersection 401.

The string similarity model 122 may identify a near-intersection 403 between diff_a_i and diff_b_i. The near-intersection 403 defines segments (if any) in diff_a_i that are similar to segments in diff_b_i. For example, the near-intersection 403 may include words (and/or other segments) in diff_a_i that are similar to diff_b_i. Thus, the near-intersection may define segments in the first string that are similar to but do not exactly match other segments in the second string. This may occur when words or other segments in the first string or the second string are misspelled, abbreviated (if not in the dictionary), or otherwise may refer to the same word in one string but has some variation in the other string.

To generate the near-intersection 403, the string similarity model 122 may perform segment similarity comparisons of all unique pairs of segments in diff_a_i and diff_b_i. For example, the string similarity model 122 may identify the smaller of diff_a_i and diff_b_i in terms of number of segments each have. In this example, diff_b_i has the smaller number of segments. The string similarity model 122 may perform a segment similarity comparison between each segment in diff_b_i with each segment in diff_a_i. For example, the string similarity model 122 may determine a segment similarity between each of pairs: "Street"–"Streat"; "Street"–"Suite"; and "Street"–"101". Likewise, the string similarity model 122 may determine a segment similarity between each of pairs: "#101"–"Streat"; "#101"–"Suite"; and "#101"–"101".

Segment Similarity

To perform segment similarity for inclusion as part of a near-intersection 403, the string similarity model 122 may use an edit distance that takes into account the length of each segment being compared. For example, the string similarity model 122 may determine the segment similarity between compared segments based on Equation 3 below:

$$S_{segment} = 1 - \frac{dist\ (segment\_a, segment\_b)}{\max(len\ (segment_a), len\ (segment_b))}, \quad (3)$$

in which:
$S_{segment}$=segment similarity score indicating similarity of segment_a and segment_b;
dist(segment_a, segment_b)=a distance metric indicating a difference between segment_a and segment_b; and
max(len(segment_a), len(segment_b))=the larger length among the lengths of segment_a and segment_b.

The segment similarity score may represent a level of similarity between a pair of segments (segment_a and segment_b) based on a distance metric and length of the larger of the two segments. The distance metric may be an edit distance that measures a number of changes that needs to be made to one segment (such as segment_a) to match the other segment (such as segment_b). Thus, less similar segments will result in a larger distance between the segments. In some examples, the edit distance may be a Levenshtein distance, a hamming distance, a Jaro-Winkler distance, and/or other edit distance. The string similarity model 122 may use other types of similarity models for the distance metric. For example, the string similarity model 122 may use a sequence-based similarity model that assesses similarity based on matching substrings between the segments.

In the example of Equation 3, a larger distance (difference) between the segments results in a lower segment similarity score. The effect of the distance may be moderated by the largest length of the segments being compared. Thus, differences between segments will have less impact on the segment similarity score as segment length increases. A segment similarity score of 0 indicates there is no similarity between the segments while a segment similarity score of 1 indicates the segments are identical.

The string similarity model 122 may compare the segment similarity score to a segment similarity threshold value to determine whether the segments should be considered part of the near-intersection 403. For example, if the segment similarity score meets or exceeds the segment similarity threshold value, the string similarity model 122 may increment a counter that counts the number of segments in the near-intersection 403. In some examples, only highest scoring segment similarity scores for a given segment in the diff_a_i or diff_b_i being compared that exceeds the segment similarity threshold value may be added to the near-intersection 403. This may avoid double-counting if, for example, a given segment in diff_a_i has multiple similarity matches in diff_b_i. In other examples, all matches that exceed the segment similarity threshold value may be added to the near-intersection 403.

The segment similarity threshold value may be predefined by a developer and/or may be learned from prior observations of segments that have been included in the near-intersection 403. It should be noted that the segment similarity threshold value may be specific for each data field. For example, an address may be associated with one segment similarity threshold value, while an entity name may be associated with another segment similarity threshold value.

Identifying Non-Intersections

The string similarity model 122 may identify a non-intersection 405 between set_a and set_b. The non-intersection 405 defines segments in set_a and set_b that are not in the intersection 401 and not in the near-intersection 403. For example, the non-intersection 405 may include words (if any) and/or other segments that are not exact matches and not above a segment similarity threshold value between set_a and set_b. In the example of FIG. 4, the non-intersection includes the word "Suite" because this word from set_a is not in the set_b and is not similar to other words in set_b. In set_b, all words are either in set_a or are similar to seta beyond the segment similarity threshold value.

String Similarity Based on the Intersection, Near-Intersection, and Non-Intersection The string similarity model 122 may generate a string similarity score based on the intersection 401, near-intersection 403, and non-intersection 405. In some examples, the string similarity model 122 may perform a preliminary test to the string similarity score. For example, the preliminary test may be given by Equation 4:

$$S_{string} = 0 \text{ if } K^2 < J^2. \quad (4),$$

In which:
K=the sum of the number of segments in the intersection 401 and the number of segments in the near-intersection 403, and
J=the number of segments in the non-intersection 405.

As illustrated in Equation (4), the string similarity model 122 may set the string similarity score to zero (indicating no similarity) if the sum of the number of segments in the intersection 401 and the number of segments in the near-intersection 403 is less than the number of segments in the non-intersection 405. It should be noted that a weighting value may be added to $K^2$ or $J^2$. It should be noted that a value may be added to either $K^2$ or $J^2$ in Equation 4 to adjust the threshold at which the string similarity score is set to zero. As illustrated, the value is zero.

If the sum of the number of segments in the intersection 401 and the number of segments in the near-intersection 403 is greater than the number of segments in the non-intersection 405, then the string similarity model 122 may generate the string similarity score according to Equation 5:

$$S_{string} = \frac{K^2 - J^2}{L}, \quad (5)$$

in which:
K=the sum of the number of segments in the intersection 401 and the number of segments in the near-intersection 403,
J=the number of segments in the non-intersection 405, and L=a modifier that adjusts the similarity score based on a difference in cardinality of diff_a_i and diff_b_i and a parameter to control the penalty imposed by the difference in cardinality.

Equation 6 show an example of determining the modifier (L):

$$L = \frac{(K^2 - J^2) + \text{abs}(|\text{diff\_a\_i}| - |\text{diff\_b\_i}|)}{SL}, \quad (6)$$

in which:
K=the sum of the number of segments in the intersection 401 and the number of segments in the near-intersection 403,
J=the number of segments in the non-intersection 405,
|diff_a_i|=the cardinality of diff_a_i,
|diff_b_i|=the cardinality of diff_b_i, and
SL=the parameter to control the penalty imposed by differences in cardinality.

If there is a large difference in cardinality between diff_a_i and diff_b_i, then the modifier (L) will tend to be larger, making the string similarity score ($S_{string}$) smaller. This is because larger differences in the cardinality may indicate that one of the two candidate strings have many more non-matching segments compared to the other candidate string, making the candidate strings less likely to be similar to one another. Thus, differences in cardinality may impose a penalty on the string similarity score. In some examples, to moderate this penalty effect, the SL may be adjusted as needed. For example, the SL parameter may be set to a default value and/or may be adjusted for specific datasets.

By using the intersection 401, near-intersection 403, and non-intersection 405, the string similarity model 122 may determine similarity of a first candidate string 402 and a second candidate string 404 without respect to variations in segment order because the segments are modelled based on arrays or sets of words rather than relying on the order in which those words appear in each candidate string. The string similarity model 122 may also tolerate variations in spelling or abbreviations by applying a segment similarity score at the segment level and also takes into account the length of the longest segment being compared.

The geo similarity model 124 may generate a geocoordinate similarity score that indicates a level of similarity between a first set of geocoordinates and a second set of geocoordinates. For example, the geo similarity model 124 may generate the geocoordinate similarity score based on Equation 7:

$$S_{geo} = \frac{1}{10 \; x \; \exp \; (\text{haversine\_distance})}. \quad (7)$$

The haversine distance is an angular distance between two points on the surface of a sphere. The two points may each be defined by a geocoordinate encoding. The geocoordinate encoding may include a latitude and longitude coordinate, although other geocoordinate encodings may be used instead or in addition. Each geocoordinate encoding may be stored by respective data fields 211 and 213D of data records 201 and 203 being compared.

Figure 5:
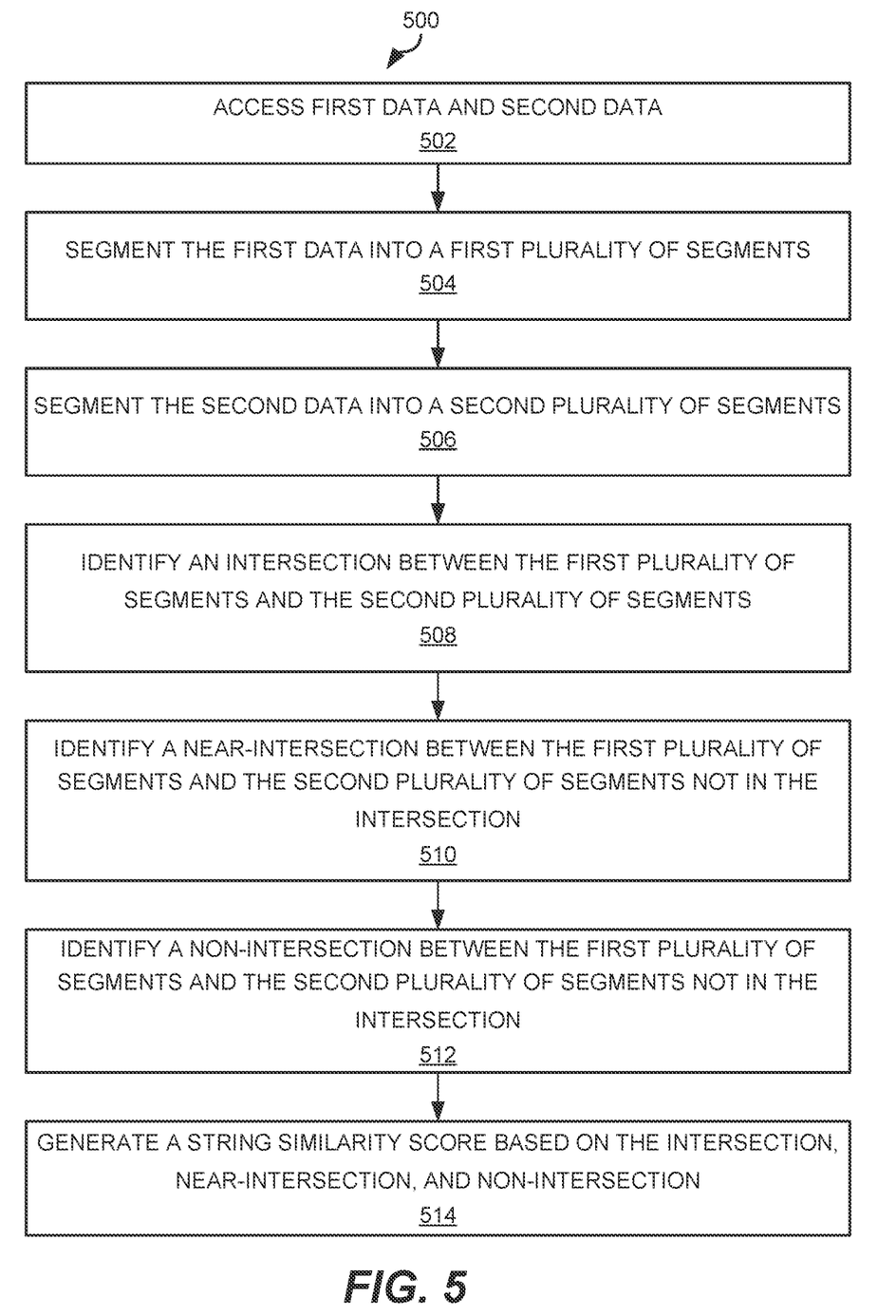
FIG. 5 illustrates an example of a method of computationally evaluating similarity between data based on an intersection, near-intersection, and non-intersection between respective segments of the data records, and non-intersections between the data.

FIG. 5 illustrates an example of a method 500 of computationally evaluating similarity between data based on an intersection, near-intersection, and non-intersection between respective segments of the data records, and non-intersections between the data.

At 502, the method 500 may include accessing first data and second data. The first data may include a first data value, such as a value stored in a first data field 211 illustrated in FIG. 2. The first data value may include a string and/or other type of data. The second data may include a second data value, such as a value stored in a second data field 213 illustrated in FIG. 3. The second data value may include a string and/or other type of data.

At 504, the method 500 may include segmenting the first data into a first plurality of segments. In other words, the first data may be split into component segments, such as using a segment separator. Each segment of the first plurality of segments may include a portion of the first data. For example, each segment of the first plurality of segments may be a word or other portion of the first string or other type of data having multiple segments of data.

At 506, the method 500 may include segmenting the second data into a plurality of segments. Each segment of the second plurality of segments may include a portion of the second data. For example, each segment of the second plurality of segments may be a word or other portion of the second string or other type of data having multiple segments of data. It should be noted that the first data and/or the second data may already be segmented, in which case 504 and/or 506 may be unnecessary.

At 508, the method 500 may include identifying an intersection (such as intersection 401 illustrated in FIG. 4) between the first plurality of segments and the second plurality of segments. At 510, the method 500 may include identifying a near-intersection (such as near-intersection 403 illustrated in FIG. 4) between the first plurality of segments and the second plurality of segments. At 512, the method 500 may include identifying a non-intersection (such as non-intersection 405 illustrated in FIG. 4) between the first plurality of segments and the second plurality of segments. At 514, the method 500 may include generating a string similarity score based on the intersection, near-intersection, and non-intersection. An example of the string similarity score is shown at Equation 5.

Figure 6:
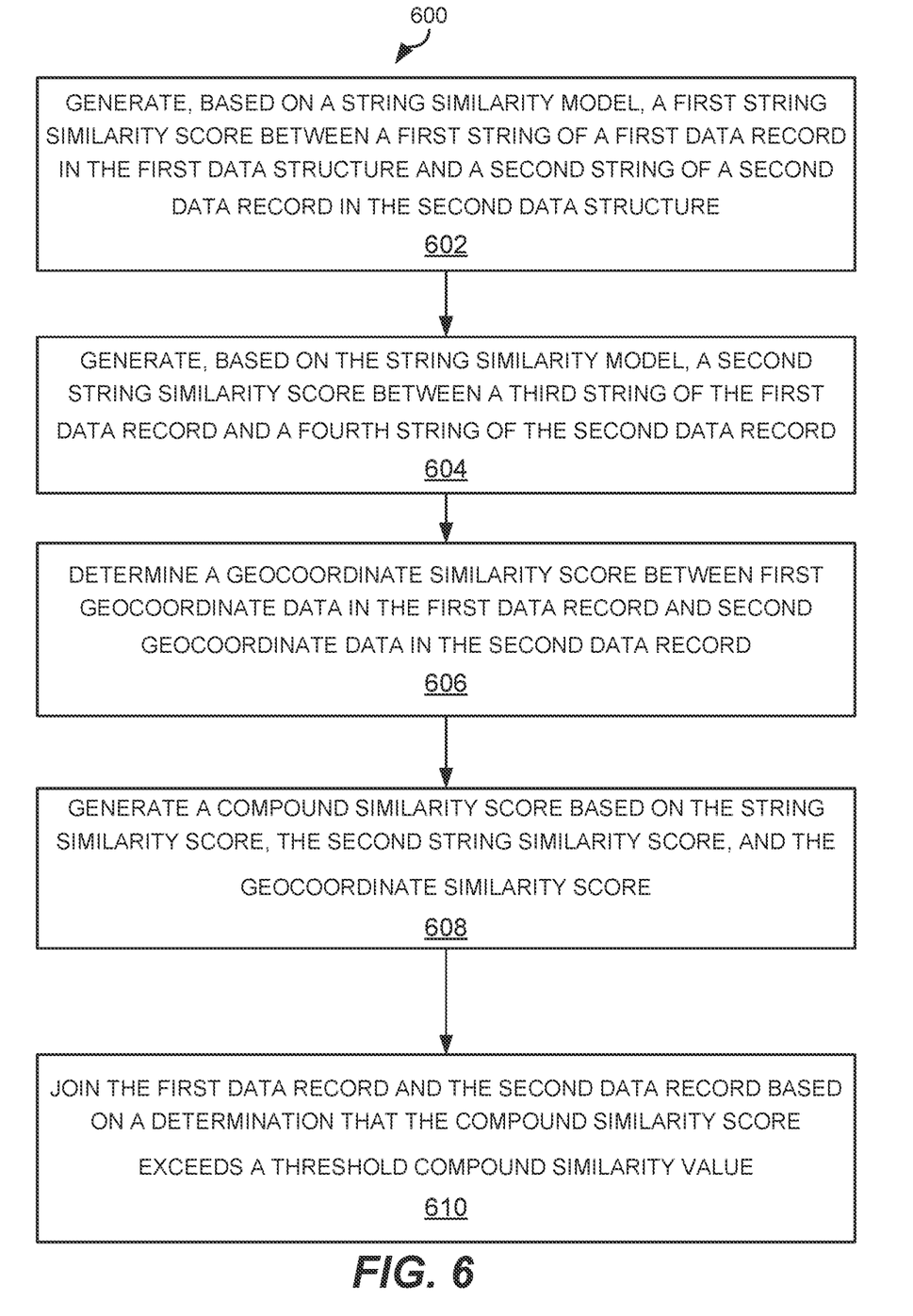
FIG. 6 illustrates an example of a method of joining data structures based on compound similarity between respective data records of the data structures.

FIG. 6 illustrates an example of a method 600 of joining data structures based on compound similarity between respective data records of the data structures. Examples of data structures include first and second data structures 101 and 103 illustrated in FIG. 1.

At 602, the method 600 may include generating, based on a string similarity model (such as string similarity model 122 illustrated in FIG. 1), a first string similarity score between a first string of a first data record (such as a data record 211 illustrated in FIG. 2) in the first data structure and a second string of a second data record in the second data structure. The first string similarity score may be generated without respect to an order of a first plurality of segments in the first string and without respect to an order of a second plurality of segments in the second string. For example, an order of segments in the first string and an order of segments in the second string does not affect the first string similarity score. In a particular example, an order of segments in a first string "123 Main Street" and an order of segments in a second string "Main Street 123" does not impact the string similarity score. It should be noted that, in some examples, the first and second data records may be from the same data structure. In these examples, the first and second data structures are the same data structure. This may be advantageous to perform self-joins within the data structure. One example use of the self-join may be to identify redundant data records that relate to the same item but have non-exact matching data fields.

At 604, the method 600 may include generating, based on the string similarity model, a second string similarity score between a third string of the first data record and a fourth string of the second data record.

At 606, the method 600 may include determining a geocoordinate similarity score between first geocoordinate data in the first data record and second geocoordinate data in the second data record. The geocoordinate similarity score may be generated by the geo similarity model 124 illustrated in FIG. 1.

At 608, the method 600 may include generating a compound similarity score based on the string similarity score, the second string similarity score, and the geocoordinate similarity score. The compound similarity score may be generated by the CSS generator 120 illustrated in FIG. 1.

At 610, the method 600 may include joining the first data record and the second data record based on a determination that the compound similarity score exceeds a threshold compound similarity value. In some examples, the joining may also be based on a highest CSS between compared records. For example, referring to FIGS. 2 and 3, record 201A may be compared to each of the records 203A-N, resulting in a CSS for each comparison. If more than one CSS exceeds the threshold compound similarity value, then the pair of records 201A and 203A-N having the highest CSS may be selected for joining. For example, if record 201A and record 203B have a CSS of 0.7 and record 201A and record 203N have a CSS of 0.8, and both exceed the threshold compound similarity value, then record 201A and record 203N may be joined because that pair has the highest CSS that also exceeds the threshold compound similarity value.

Figure 7A:
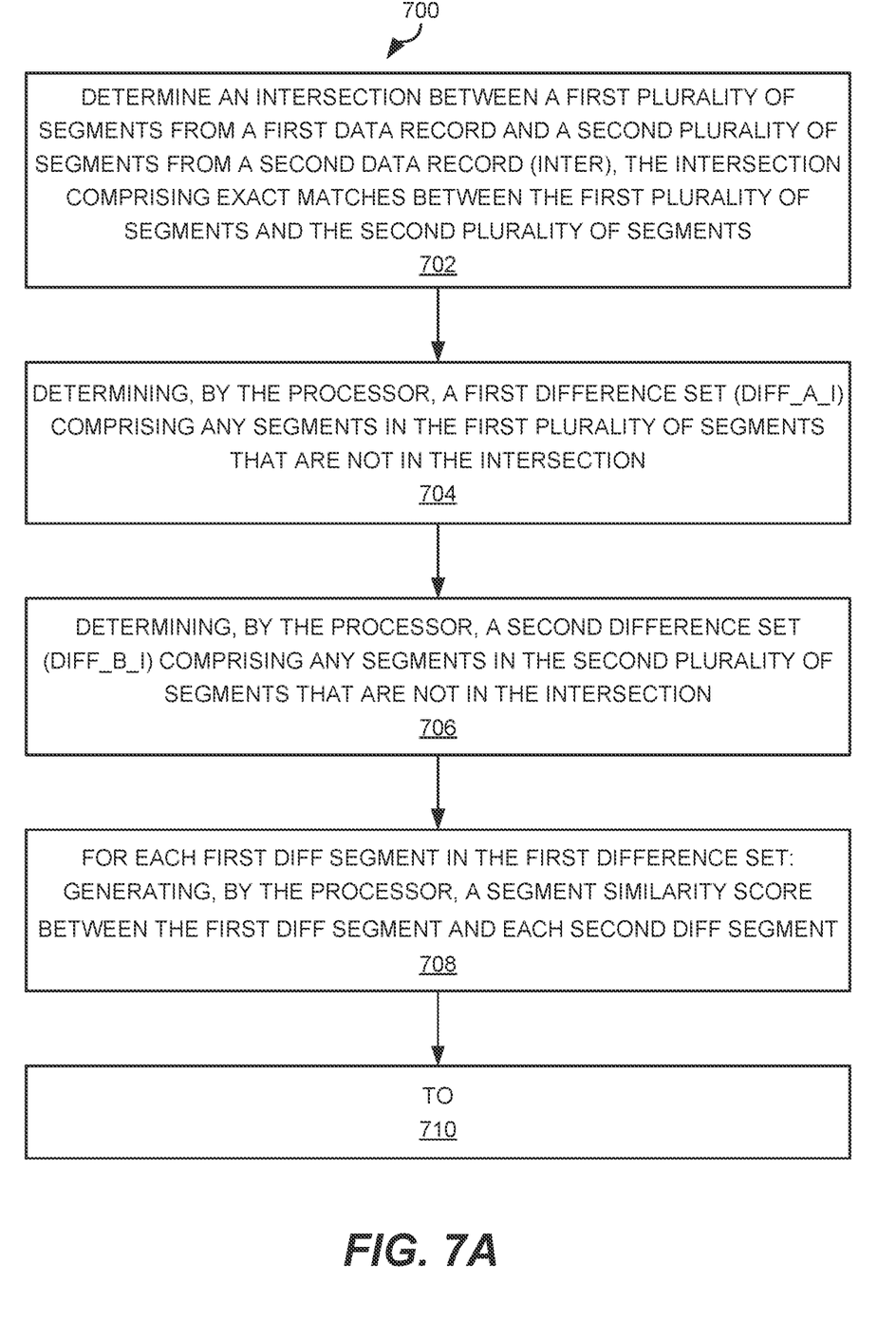
FIGS. 7A and 7B together illustrates another example of a method of computationally evaluating similarity between data records based on an intersection, near-intersection, and non-intersection between respective segments of the data records.
Figure 7B:
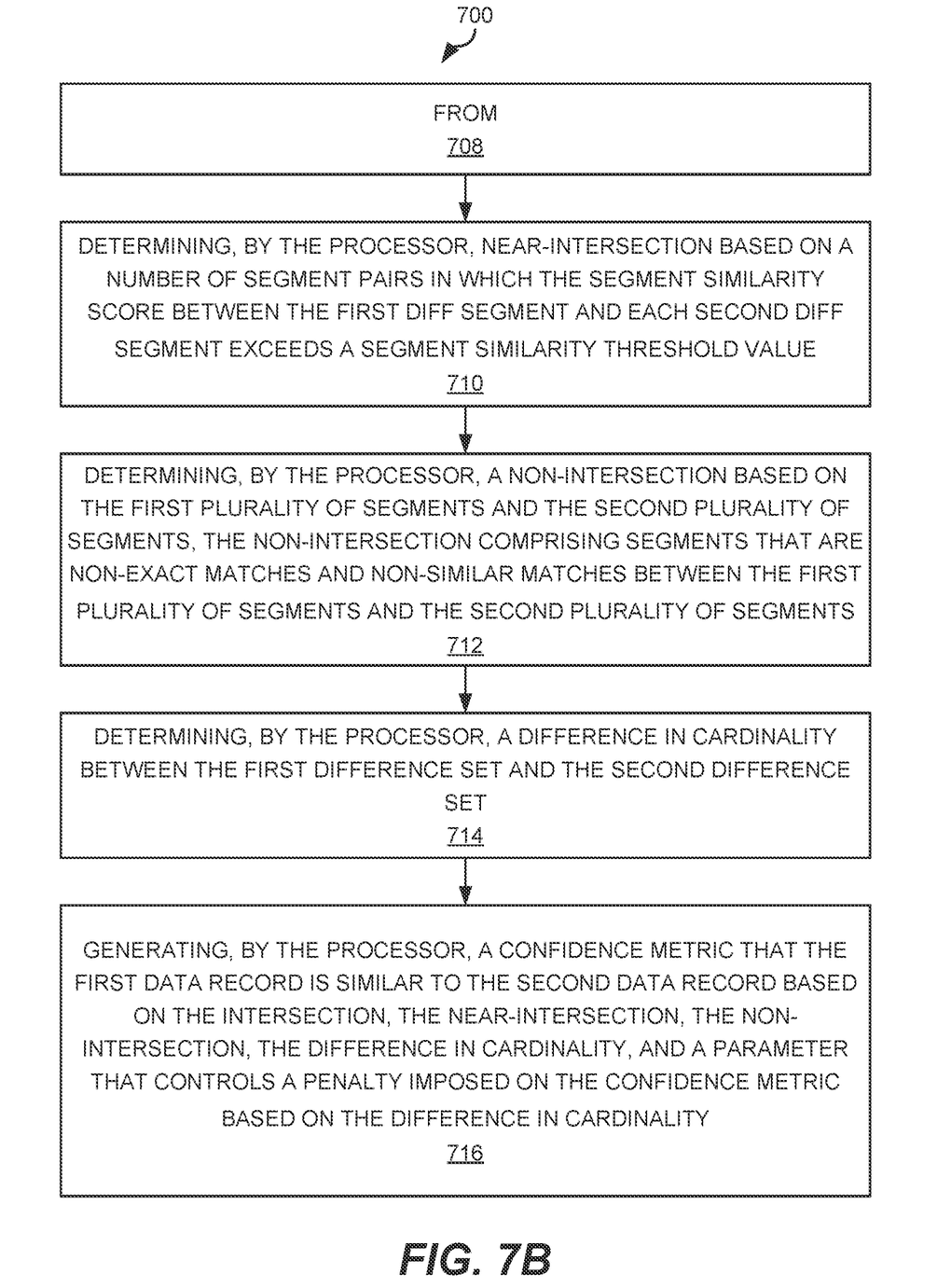

FIGS. 7A and 7B together illustrates another example of a method 700 of computationally evaluating similarity between data records based on an intersection, near-intersection, and non-intersection between respective segments of the data records. Reference will be made to FIG. 4 for illustration.

At 702, the method 700 may include determining an intersection (such as intersection 401) between a first plurality of segments (such as seta) from a first data record (such as a candidate string 402 from a data field 211) and a second plurality of segments (such as set_b) from a second data record (such as a candidate string 404 from a data field 213). The intersection may define exact matches between the first plurality of segments and the second plurality of segments.

At 704, the method 700 may include determining a first difference set (such as diff_a_i) comprising any segments in the first plurality of segments that are not in the intersection.

At 706, the method 700 may include determining a second difference set (diff_b_i) comprising any segments in the second plurality of segments that are not in the intersection.

At 708, the method 700 may include, for each first diff segment in the first difference set: generating a segment similarity score (such as $S_{segment}$ illustrated in Equation 3) between the first diff segment and each second diff segment.

At 710, the method 700 may include determining a near-intersection (such as near-intersection 403) based on a number of segment pairs in which the segment similarity score between the first diff segment and each second diff segment exceeds a segment similarity threshold value.

At 712, the method 700 may include determining a non-intersection (such as non-intersection 405) based on the first plurality of segments and the second plurality of segments, the non-intersection comprising segments that are non-exact matches and non-similar matches between the first plurality of segments and the second plurality of segments.

At 714, the method 700 may include determining a difference in cardinality (such as abs(|diff_a_i|−|diff_b_i| illustrated in Equation 6) between the first difference set and the second difference set.

At 714, the method 700 may include generating a confidence metric (such as a string similarity score) that the first data record is similar to the second data record based on the intersection, the near-intersection, the non-intersection, the difference in cardinality, and a parameter that controls a penalty imposed on the confidence metric based on the difference in cardinality.

At least some of the components of the system 100 may be remote from one another. In these examples, the computer system 110 may access the data structures 101 and 103 via a network, which may include the Internet, an intranet, a Personal Area Network, a LAN (Local Area Network), a WAN (Wide Area Network), a SAN (Storage Area Network), a MAN (Metropolitan Area Network), a wireless network, a cellular communications network, a Public Switched Telephone Network, and/or other network through which the computer system 110 may communicate.

Figure 8:
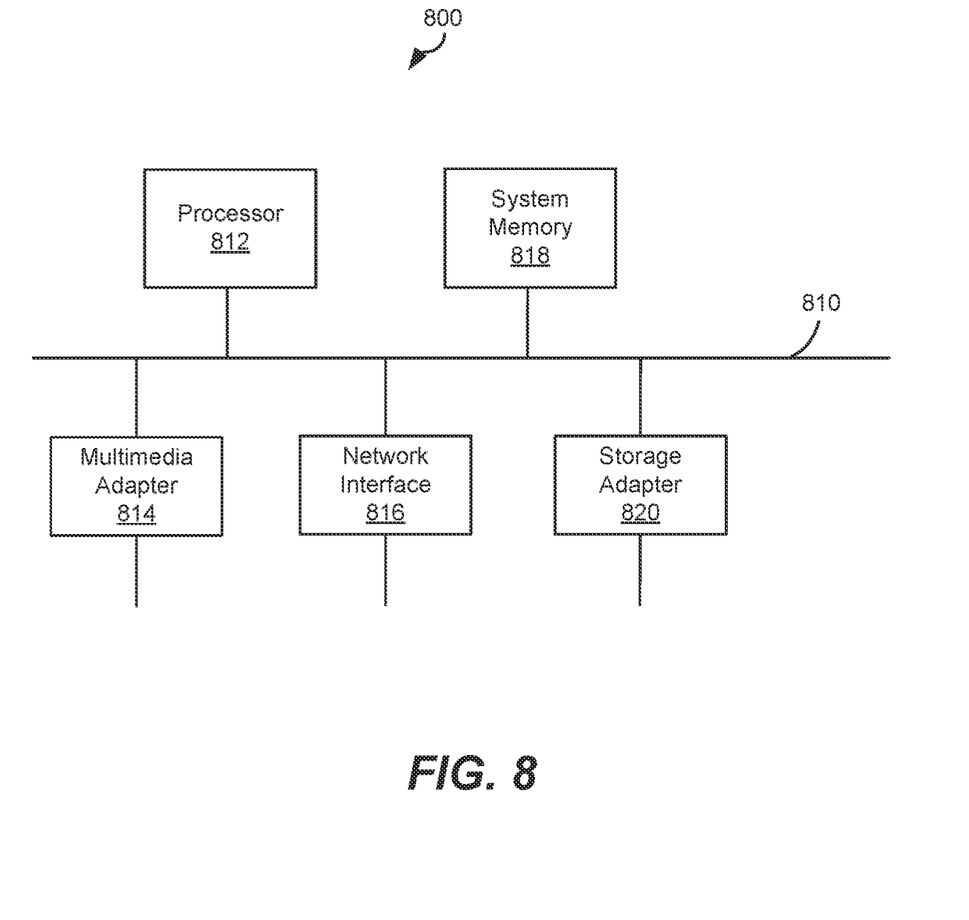
FIG. 8 illustrates an example of a computer system that may be implemented by devices illustrated in FIG. 1.

FIG. 8 illustrates an example of a computer system 800 that may be implemented by the computer system 110 illustrated in FIG. 1. For example, the computer system 110 may be implemented based on some or all of the computer system 800. The computer system 800 may include, among other things, an interconnect 810, a processor 812, a multimedia adapter 814, a network interface 816, a system memory 818, and a storage adapter 820.

The interconnect 810 may interconnect various subsystems, elements, and/or components of the computer system 800. As shown, the interconnect 810 may be an abstraction that may represent any one or more separate physical buses, point-to-point connections, or both, connected by appropriate bridges, adapters, or controllers. In some examples, the interconnect 810 may include a system bus, a peripheral component interconnect (PCI) bus or PCI-Express bus, a HyperTransport or industry standard architecture (ISA)) bus, a small computer system interface (SCPI) bus, a universal serial bus (USB), IIC (I2C) bus, or an Institute of Electrical and Electronics Engineers (IEEE) standard 1384 bus, or "firewire," or other similar interconnection element.

In some examples, the interconnect 810 may allow data communication between the processor 812 and system memory 818, which may include read-only memory (ROM) or flash memory (neither shown), and random-access memory (RAM) (not shown). It should be appreciated that the RAM may be the main memory into which an operating system and various application programs may be loaded. The ROM or flash memory may contain, among other code, the Basic Input-Output system (BIOS) which controls basic hardware operation such as the interaction with one or more peripheral components.

The processor 812 may control operations of the computer system 800. In some examples, the processor 812 may do so by executing instructions such as software or firmware stored in system memory 818 or other data via the storage adapter 820. In some examples, the processor 812 may be, or may include, one or more programmable general-purpose or special-purpose microprocessors, digital signal processors (DSPs), programmable controllers, application specific integrated circuits (ASICs), programmable logic device (PLDs), trust platform modules (TPMs), field-programmable gate arrays (FPGAs), other processing circuits, or a combination of these and other devices.

The multimedia adapter 814 may connect to various multimedia elements or peripherals. These may include devices associated with visual (e.g., video card or display), audio (e.g., sound card or speakers), and/or various input/output interfaces (e.g., mouse, keyboard, touchscreen).

The network interface 816 may provide the computer system 800 with an ability to communicate with a variety of remote devices over a network. The network interface 816 may include, for example, an Ethernet adapter, a Fibre Channel adapter, and/or other wired- or wireless-enabled adapter. The network interface 816 may provide a direct or indirect connection from one network element to another and facilitate communication and between various network elements. The storage adapter 820 may connect to a standard computer readable medium for storage and/or retrieval of information, such as a fixed disk drive (internal or external).

The term "engine" as used herein may refer to instructions that program hardware and/or hardware that is specifically programmed to perform the functions described with respect to that engine. The term "prediction model" as used herein may refer to a computational analysis of text elements such as words in two or more strings to determine a level of confidence that the strings are similar to one another.

Other devices, components, elements, or subsystems (not illustrated) may be connected in a similar manner to the interconnect 810 or via a network. The devices and subsystems can be interconnected in different ways from that shown in FIG. 8. Instructions to implement various examples and implementations described herein may be stored in computer-readable storage media such as one or more of system memory 818 or other storage. Instructions to implement the present disclosure may also be received via one or more interfaces and stored in memory. The operating system provided on computer system 800 may be MS-DOS®, MS-WINDOWS®, OS/2®, OS X®, IOS®, ANDROID®, UNIX®, Linux®, or another operating system.

In operation, the disclosed systems and methods may be used in various contexts. In one example context, the disclosure may be implemented to augment one data structure 101 with the data from another data structure 103. As a non-limiting example, a payment network may have its own data relating to merchants that accept payments through the payment network. However, the data relating to merchants may be incomplete or inaccurate. The payment network may access third party data relating to entities, including merchants. An example of such third party data may include data from AggData, which provides merchant data that may be unknown or unavailable to the payment network. However, the payment network may be unable to match such third party merchant data with its merchant data. This may be because the payment network merchant and the third party merchant data may be formatted differently (such as examples of address format differences shown in FIGS. 2 and 3), one may include errors in various fields of data, and/or other variations. By using a computer system 110 improved to automatically join data records based on compound similarity, the payment network may be able to match data records from its internal data with data records from third party providers, thereby enriching (adding to) and/or replacing its own data records. It should be further noted that the string similarity model 122 may be used in various contexts other than for joining data records. For example, the string similarity model 122 may be used whenever similarity between strings with multiple segments are useful. In particular, such contexts may include natural language processing, machine translation, recommendation engines, bioinformatic sequences comparisons, and/or others.

The term "model" may refer to computer functions that provide functionality described with respect to that model. Such functionality may be "automatic" in that the model may provide such functionality without human intervention. Throughout the disclosure, the terms "a" and "an" may be intended to denote at least one of a particular element. As used herein, the term "includes" means includes but not limited to, the term "including" means including but not limited to. The term "based on" means based at least in part on. In the Figures, the use of the letter "N" to denote plurality in reference symbols is not intended to refer to a particular number. For example, "201A-N" does not refer to a particular number of instances of 201A-N, but rather "two or more."

The databases (such as the data structures 101, 103, 105) may be, include, or interface to, for example, an Oracle™ relational database sold commercially by Oracle Corporation. Other databases, such as Informix™, DB2 or other data storage, including file-based (such as spreadsheet or extensible markup language documents), or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may include cloud-based storage solutions. The database may store a plurality of types of data and/or files and associated data or file descriptions, administrative information, or any other data. The various databases may store predefined and/or customized data described herein.

The systems and processes are not limited to the specific embodiments described herein. In addition, components of each system and each process can be practiced independent and separate from other components and processes described herein. Each component and process also can be used in combination with other assembly packages and processes. The flow charts and descriptions thereof herein should not be understood to prescribe a fixed order of performing the method blocks described therein. Rather the method blocks may be performed in any order that is practicable including simultaneous performance of at least some method blocks. Furthermore, each of the methods may be performed by one or more of the system components illustrated in FIG. 1.

This written description uses examples to disclose the embodiments, including the best mode, and to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system of joining data structures based on compound similarity between respective data records of the data structures, comprising:
   a memory that stores a string similarity model that outputs
     a confidence metric that a pair of strings are similar to one another without respect to an order of words in either of the pair of strings;

a processor programmed to:

generate, without respect to an order of a first plurality of segments in a first string of a first data record in a first data structure and without respect to an order of a second plurality of segments in a second string of a second data record in a second data structure based on the string similarity model and a near-intersection comprising one or more similar but non-exact matches between one or more segments of the first plurality of segments and one or more segments of the second plurality of segments, a first string similarity score between the first string and the second string;

generate, based on the string similarity model, a second string similarity score between a third string of the first data record and a fourth string of the second data record, wherein the second string similarity score is generated without respect to an order of a third plurality of segments in the third string and without respect to an order of a fourth plurality of segments in the fourth string;

determine a geocoordinate similarity score between first geocoordinate data in the first data record and second geocoordinate data in the second data record;

generate a compound similarity score based on the first string similarity score, the second string similarity score, and the geocoordinate similarity score; and join the first data record and the second data record based on a determination that the compound similarity score exceeds a threshold compound similarity value.

2. The system of claim 1, wherein to generate the first string similarity score, the processor is further programmed to:

determine the first plurality of segments based on the first string; and determine the second plurality of segments based on the second string, wherein the first string similarity score is based on the first plurality of segments and the second plurality of segments.

3. The system of claim 2, to generate the first string similarity score, the processor is further programmed to:

determine an intersection based on the first plurality of segments and the second plurality of segments, the intersection comprising exact matches between the first plurality of segments and the second plurality of segments;

determine a non-intersection based on the first plurality of segments and the second plurality of segments, the non-intersection comprising segments that are non-exact matches and non-similar matches between the first plurality of segments and the second plurality of segments, wherein the first string similarity score is based on the intersection, the near-intersection, and the non-intersection.

4. The system of claim 3, wherein to determine the near-intersection, the processor is further programmed to:

determine a first difference set comprising any segments in the first plurality of segments that are not in the intersection;

determine a second difference set comprising any segments in the second plurality of segments that are not in the intersection;

for each first diff segment in the first difference set:

generate a segment similarity score between the first diff segment and each second diff segment; and for the highest segment similarity score that exceeds a segment similarity threshold value, add a first diff segment and second diff segment pair to the near-intersection.

5. The system of claim 4, wherein to add the first difference segment and second difference segment pair to the near-intersection, the processor is further programmed to:

increment a counter that counts a number of segments in the near-intersection.

6. The system of claim 4, wherein to generate the segment similarity score, the processor is further programmed to:

generate an edit distance between the first difference segment the second difference segment;

determine which one of the first difference segment or the second difference segment has a larger segment length, wherein the segment similarity score is determined based on the edit distance and a length of the segment having the larger segment length.

7. The system of claim 4, wherein to generate the first string similarity score, the processor is further programmed to:

determine a first cardinality of the first difference set;

determine a second cardinality of the second difference set; and determine a difference between the first cardinality and the second cardinality, wherein the difference between the first cardinality and the second cardinality imposes a penalty on the first string similarity score.

8. The system of claim 7, wherein to generate the first string similarity score, the processor is further programmed to:

moderate the penalty based on a parameter to control the penalty imposed by differences in cardinality.

9. The system of claim 8, wherein the parameter is location-specific that depends on a geographic location associated with the first data record or the second data record.

10. The system of claim 1, wherein to generate the compound similarity score, the processor is further programmed to:

adjust the first string similarity score based on a first weight;

adjust the second string similarity score based on a second weight; and adjust the geocoordinate similarity score based on a third weight.

11. The system of claim 1, wherein the first string and the second string each describe a name of an entity.

12. The system of claim 1, wherein the third string and the fourth string each describe an address of an entity.

13. The system of claim 1, wherein the first geocoordinate data and the second geocoordinate data each describe one or more geographic coordinates of an entity.

14. The system of claim 13, wherein the first geocoordinate data comprises first latitude and longitude coordinates and the second geocoordinate data comprises second latitude and longitude coordinates, and wherein to generate the geocoordinate similarity score, the processor is further programmed to:

generate a haversine distance between the first latitude and longitude coordinates and the second latitude and longitude coordinates.

15. A method of determining similarity between data, comprising:

determining, by a processor, an intersection between a first plurality of segments from a first data record and a second plurality of segments from a second data record, the intersection comprising exact matches between the first plurality of segments and the second plurality of segments;

determining, by the processor, a first difference set comprising any segments in the first plurality of segments that are not in the intersection;

determining, by the processor, a second difference set comprising any segments in the second plurality of segments that are not in the intersection;

for each first diff segment in the first difference set:
generating, by the processor, a segment similarity score between the first diff segment and each second diff segment;

determining, by the processor, a near-intersection based on a number of segment pairs in which the segment similarity score between the first diff segment and each second diff segment exceeds a segment similarity threshold value;

determining, by the processor, a non-intersection based on the first plurality of segments and the second plurality of segments, the non-intersection comprising segments that are non-exact matches and non-similar matches between the first plurality of segments and the second plurality of segments;

determining, by the processor, a difference in cardinality between the first difference set and the second difference set; and generating, by the processor, a confidence metric indicating a confidence that the first data record is similar to the second data record based on the intersection, the near-intersection, the non-intersection, the difference in cardinality, and a parameter that controls a penalty imposed on the confidence metric based on the difference in cardinality.

16. The method of claim 15, wherein the first plurality of segments is stored in a first data field of a first data record in a first data structure and the second plurality of segments is stored in a second data field of a second data record in a second data structure, the method further comprising:
determining that the first data record and the second data record should be joined based on the confidence metric.

17. The method of claim 15, responsive to determining that the first data record and the second data record should be joined based on the confidence metric, the method further comprising:
augmenting the first data record with one or more second data fields of the second data record.

18. The method of claim 15, responsive to determining that the first data record and the second data record should be joined based on the confidence metric, the method further comprising:
replacing one or more values of the first data record with one or more second values of the second data record.

19. A non-transitory computer readable medium storing instructions for determining data record matches between a first data record and a second data record, the first data record having a first plurality of words and the second data record having a second plurality of words, the instructions, when executed by a processor, causes the processor to:
determine an intersection between a first plurality of segments from a first data record and a second plurality of segments from a second data record, the intersection comprising exact matches between the first plurality of segments and the second plurality of segments;

determine a first difference set comprising any segments in the first plurality of segments that are not in the intersection;

determine a second difference set comprising any segments in the second plurality of segments that are not in the intersection;

for each first diff segment in the first difference set:
generate a segment similarity score between the first diff segment and each second diff segment;

determine a near-intersection based on a number of segment pairs in which the segment similarity score between the first diff segment and each second diff segment exceeds a segment similarity threshold value;

determine a non-intersection based on the first plurality of segments and the second plurality of segments, the non-intersection comprising segments that are non-exact matches and non-similar matches between the first plurality of segments and the second plurality of segments;

determine a difference in cardinality between the first difference set and the second difference set; and generate a confidence metric indicating a confidence that the first data record is similar to the second data record based on the intersection, the near-intersection, the non-intersection, the difference in cardinality, and a parameter that controls a penalty imposed on the confidence metric based on the difference in cardinality.

20. The non-transitory computer readable medium of claim 19, wherein the instructions, when executed by the processor, further cause the processor to:
generate a sum of a number of segments in the intersection and a number of segments in the near-intersection, wherein the confidence metric is based on the sum.

* * * * *